United States Patent
Bacco et al.

(10) Patent No.: US 9,552,684 B2
(45) Date of Patent: Jan. 24, 2017

(54) METHODS AND SYSTEMS CONFIGURED TO DETECT AND GUARANTEE IDENTITY FOR THE PURPOSE OF DATA PROTECTION AND ACCESS CONTROL

(71) Applicant: Secure Gravity Inc., Bellevue, WA (US)

(72) Inventors: Edward M. Bacco, Leavenworth, WA (US); Domenic P. Prinzivalli, Redmond, WA (US); Anthony T. Collins, Seattle, WA (US)

(73) Assignee: SECURE GRAVITY INC., Bellevue, WA (US)

( * ) Notice: Subject to any disclaimer, the term of this patent is extended or adjusted under 35 U.S.C. 154(b) by 51 days.

(21) Appl. No.: 14/614,300

(22) Filed: Feb. 4, 2015

(65) Prior Publication Data

US 2015/0221151 A1 Aug. 6, 2015

Related U.S. Application Data

(60) Provisional application No. 62/078,697, filed on Nov. 12, 2014, provisional application No. 61/935,785, filed on Feb. 4, 2014.

(51) Int. Cl.
| | |
|---|---|
| *G05B 19/00* | (2006.01) |
| *G05B 23/00* | (2006.01) |
| *G06F 7/00* | (2006.01) |
| *G06F 7/04* | (2006.01) |
| *G06T 1/00* | (2006.01) |
| *G06T 7/00* | (2006.01) |
| *G08B 29/00* | (2006.01) |

(Continued)

(52) U.S. Cl.
CPC .............................. *G07C 9/00158* (2013.01)

(58) Field of Classification Search
CPC .................................................. G07C 9/00158
See application file for complete search history.

(56) References Cited

U.S. PATENT DOCUMENTS

| | | |
|---|---|---|
| 6,052,785 A | 4/2000 | Lin |
| 6,965,294 B1 | 11/2005 | Elliott |

(Continued)

FOREIGN PATENT DOCUMENTS

WO 2012001014 A1 1/2012

OTHER PUBLICATIONS

International Search Report and Written Opinion mailed May 21, 2015, issued in International Application No. PCT/US2015/014506, filed Feb. 4, 2015, 10 pages.

*Primary Examiner* — Erin File
(74) *Attorney, Agent, or Firm* — Christensen O'Connor Johnson Kindness PLLC

(57) ABSTRACT

A security system is provided that integrates physical and logical security controls for the protection of secured resources. The resources may include physical locations and/or computing resources such as databases containing personal information. In some embodiments, information is stored in separate, codependent databases such that by isolating the components of the databases from each other, a successful attack on one component is not sufficient to enable the access of content of the other components. In some embodiments, biometric information is automatically obtained as users approach an access location, and is ready for expedited verification of identity upon request by the user.

26 Claims, 10 Drawing Sheets

(51) Int. Cl.
  *G08C 19/00* (2006.01)
  *H04B 1/00* (2006.01)
  *H04B 3/00* (2006.01)
  *H04Q 1/00* (2006.01)
  *H04Q 9/00* (2006.01)
  *G07C 9/00* (2006.01)

(56) References Cited

U.S. PATENT DOCUMENTS

| | | | |
|---|---|---|---|
| 7,183,895 B2 | 2/2007 | Bazakos | |
| 7,536,304 B2 | 5/2009 | Di Mambro | |
| 7,567,844 B2 | 7/2009 | Thomas | |
| 7,847,820 B2 | 12/2010 | Vallone | |
| 7,856,558 B2 | 12/2010 | Martin | |
| 8,108,914 B2 | 1/2012 | Hernoud | |
| 8,233,043 B2 | 7/2012 | Washington | |
| 8,306,984 B2 | 11/2012 | Tereposky | |
| 8,339,455 B2 | 12/2012 | Baba | |
| 8,406,421 B2 | 3/2013 | Kamen | |
| 8,441,354 B2 | 5/2013 | Padmanabhan | |
| 8,473,748 B2 | 6/2013 | Sampas | |
| 8,499,164 B2 | 7/2013 | Ortiz | |
| 8,590,030 B1 | 11/2013 | Pei | |
| 8,661,520 B2 | 2/2014 | Shakkarwar | |
| 8,909,247 B2 | 12/2014 | Tipton | |
| 2003/0061233 A1* | 3/2003 | Manasse | G06F 17/30247 |
| 2003/0149744 A1* | 8/2003 | Bierre | G06K 9/00885 709/217 |
| 2007/0086626 A1 | 4/2007 | Mariani | |
| 2007/0174633 A1* | 7/2007 | Draper | G06K 9/00073 713/186 |
| 2007/0252001 A1 | 11/2007 | Kail | |
| 2007/0266428 A1 | 11/2007 | Downes | |
| 2009/0014254 A1 | 1/2009 | Finschi | |
| 2009/0126010 A1* | 5/2009 | Chakra | G06F 21/316 726/20 |
| 2010/0083371 A1 | 4/2010 | Bennetts | |
| 2010/0164680 A1 | 7/2010 | Yancey | |
| 2011/0148576 A1 | 6/2011 | Gupta | |
| 2011/0191840 A1 | 8/2011 | Ortiz | |
| 2011/0223888 A1* | 9/2011 | Esaki | G06F 21/32 455/411 |
| 2011/0279228 A1* | 11/2011 | Kumar | G09B 7/00 340/5.83 |
| 2012/0110341 A1 | 5/2012 | Beigi | |
| 2012/0158203 A1 | 6/2012 | Feldstein | |
| 2012/0158581 A1* | 6/2012 | Cooley | G06Q 20/102 705/40 |
| 2012/0160613 A1 | 6/2012 | Friedli | |
| 2012/0191512 A1 | 7/2012 | Wuoti | |
| 2012/0268241 A1 | 10/2012 | Hanna | |
| 2012/0313759 A1 | 12/2012 | Markwitz | |
| 2013/0031202 A1 | 1/2013 | Mick | |
| 2013/0305315 A1 | 11/2013 | Abraham | |
| 2014/0230018 A1 | 8/2014 | Anantharaman | |
| 2014/0337949 A1* | 11/2014 | Hoyos | H04L 63/0861 726/7 |
| 2015/0148013 A1* | 5/2015 | Baldwin | H04L 67/22 455/414.1 |

\* cited by examiner

METHODS AND SYSTEMS CONFIGURED TO DETECT AND GUARANTEE IDENTITY FOR THE PURPOSE OF DATA PROTECTION AND ACCESS CONTROL

CROSS-REFERENCES TO RELATED APPLICATIONS

This application claims the benefit of U.S. Provisional Application No. 62/078,697, filed Nov. 12, 2014, and U.S. Provisional Application No. 61/935,785, filed Feb. 4, 2014, the entire disclosures of which are hereby incorporated by reference herein for all purposes.

BACKGROUND

Security technology has advanced greatly since the days when showing a tin security badge to a security guard who could reasonably be expected to notice intruders was considered adequate, but in one very important way, things haven't changed all that much. Access security still largely relies on the fact that authorized persons will always follow the rules. In fact, the design of most new security systems and programs are based on the assumption that authorized persons will follow the rules. Because security guards are no longer posted at every security-sensitive location, technological tools are relied on to provide the levels of security required in today's environment, but in general, the effectiveness of the typical access control system in use today is directly linked to the users' level of willingness to adhere to the rules.

If users are willing to never share their security badge, codes, and/or passwords, never open an access controlled door and let a stranger come in behind them, question all unknown persons they encounter in the secured area, and immediately report violations to the security team, then the system will function perfectly. In reality, users do bend or break the rules for whatever reason and when that happens, it exposes the weakest link in the system, the very people the system was designed to protect in the first place: the users themselves.

Most commercial building owners/managers deploy some sort electronic security system to control access into their buildings. These systems rely on various types of technologies to authenticate the access. RFID devices, such as electronic key cards, are the most common type technology used in the physical access control industry today, but other types of devices are also used. In some typical RFID system deployments, this code is also stored in a central database and when the card is electronically scanned at a security portal (door, turnstile, gate, computing device, etc.), the code in the card is automatically compared to the code in the database and if they match up, the system "authenticates" the card and allows the access to proceed. In other embodiments, the encrypted security certificate stored by the badge may be cryptographically verified after being electronically scanned. The weakness with this design is that although it can authenticate the badge, it can't verify if the person using the badge is actually the person to whom the badge was issued.

To overcome this inherent weakness, electronic security device manufacturers have tried to deploy RFID systems with a second layer of controls (commonly known as dual authentication) such as requiring the person presenting the card to enter a PIN along with presenting the card for authentication. However, this type of system still cannot authenticate if the person presenting the card and inputting the PIN is in fact the person who really did have permission to access the area or just someone who somehow obtained both the card and the PIN.

In other schemes, the second layer of the dual authentication system might include the use of facial recognition systems or other types of biometric readers and sensors. In these cases, the existing systems can only authenticate one person at a time and typically the person requesting access has to physically interact with the system to initiate the authentication sequence by either scanning their security badge or by entering a PIN before the authentication sequence begins. The biometric authentication and physical interaction with the system are time-consuming processes, which limits their effective use to locations where very few people have access with any regularity, such as research labs, datacenters and secure rooms. Because of their low throughput rates (the time it takes to process a given number of people through a control point) these systems have proven unworkable in areas where large numbers of users have to be vetted for general building access, such as in lobbies or stairwells.

In addition to the slow speed of these systems, they share the inherent weakness of not being able to actually verify if the person presenting the security badge for authentication was the same person who accessed the security portal. For example, an authorized person may unlock the door and then allow an unauthorized person to enter either instead of themselves or in their company. This weakness can be mitigated to some extent through the use of a third layer of control deployed inside the portal, by either holding the person in the security portal itself (commonly referred to as a "man-trap") until the authentication process is complete or by detecting how many "bodies" come through the portal (commonly referred to as tailgate detection). However, existing tailgate detection technologies don't identify individuals, but instead count heat signatures using infrared technologies to count bodies passing through the portal. The most effective existing way to mitigate tailgating would be to hire guards and have them posted them at every entrance, but this is both the most expensive and the most intrusive solution. A solution that employs technology to replace the security guards while retaining the effectiveness of the security guards is desired.

Even if all three layers of controls (the two layers of dual authentication plus tailgate detection) are in place, the span of control of these systems are limited to the edge of the security area (typically, you will only see security controls such as guards, turnstiles, checkpoints and access controlled doors in the lobbies or other public access points) and they cannot detect if someone has gained unauthorized access in to the area from somewhere other than through a security control point. Also, physical control devices such as turnstiles, electronic door locks, and the like are not useful for protecting many resources for which security is sought today. Further, databases, digital financial transactions, and networks may be accessible from locations that are not all within the same physical area, or from an area in which it may not be feasible to physically control access (such as a retail store, a bank, and/or the like).

What is needed is a system for protecting secured resources that no longer relies on users to do the right thing to maintain security, is fully automated with the ability to perform multi-factor authentication at a rapid pace, detect tailgaters, reduce false alarms, and be user friendly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an identity validation system for positively confirming an identity and a physical location of an individual for securing access to one or more secured resources is provided. The system comprises one or more location sensors, one or more cameras, a facial recognition data store, and at least one security management computing device. The one or more location sensors are configured for detecting locations of mobile devices within a physical location proximate to an access location for the one or more secured resources. The one or more cameras are configured for monitoring the physical location proximate to the access location. The facial recognition data store is configured to store one or more facial data records. The at least one security management computing device is configured to receive a notification from the one or more location sensors indicating that a mobile device is detected within the physical location and is approaching the access location; in response to determining that the mobile device is enrolled with the security system, retrieve a facial data record from the facial recognition data store associated with a user associated with the mobile device; compare the facial data record to images of faces captured by the one or more cameras; and provide access to the one or more secured resources in response to determining that the facial data record matches an image of a face captured by the one or more cameras.

In some embodiments, a computer-implemented method of controlling access to a computing resource by a user via a network access device is provided. A device identifier of a mobile computing device is used to verify that the mobile computing device is associated with the user and to retrieve a profile identifier from a device data store. The profile identifier is used to verify that the user is authorized to access the computing resource and to retrieve a biometric row identifier from a profile data store. The biometric row identifier is used to retrieve biometric data from a biometric data store, and access is provided to the computing resource in response to verifying that the user matches the biometric data. The method is performed by one or more computing devices of an authentication system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, a security system is provided that integrates physical and logical security controls for the protection of secured resources. The resources may include physical locations, and/or computing resources such as databases containing personal information. In some embodiments, information is stored in separate, codependent databases such that by isolating the components of the databases from each other, a successful attack on one component is not sufficient to enable the access of content of the other components.

The abilities provided by embodiments of the present disclosure to both guarantee identity of an individual and possession/location of a specific mobile device associated with the individual has many useful applications. In some embodiments, access to information technology networks may be granted only after the system identifies and validates the physical presence of the authorized user. When the user leaves the secure area, access to IT networks is revoked. In some embodiments, the system would enable environmental control systems (heating, cooling, lighting, and/or the like) to operate on a more efficient level by detecting the presence of authorized individuals. In some embodiments, the system may allow automated facility entry systems to pair stored biometric recognition with employee authentication profiles, providing fine-grained access to sensitive, confidential, and highly-confidential areas.

In some embodiments, the system may enable a point of sale system to match an owner to a mobile device containing an electronic wallet (whether in-store or via secure remote payment) to help prevent fraud. Likewise, in some embodiments, the identify verification provided by the system can help streamline government-mandated identity confirmation for major purchases such as real estate and/or the like, and/or may otherwise be able to guarantee that an item is being transferred to a specific person.

In some embodiments, other types of events wherein presence and identity are both important may be monitored. For example, test proctoring, customer service, voting, and attendance at required events may all be monitored using embodiments of the present disclosure. Other types of identity-dependent sensitive information, such as health records access and medical identity protection, may also be provided by embodiments of the present disclosure.

In some embodiments, a person's Internet of Things (IoT) array of tools and services may be invoked in a customized way based on proximity by using the identity and location detection capabilities of the system. For example, detection of a mobile device may cause a user's house to prepare itself for the user's arrival (setting climate controls, opening pet doors) and welcoming the user upon arrival (opening garage door, unlocking doors, disabling security alarms, playing favorite music, and so on).

Figure 1A:
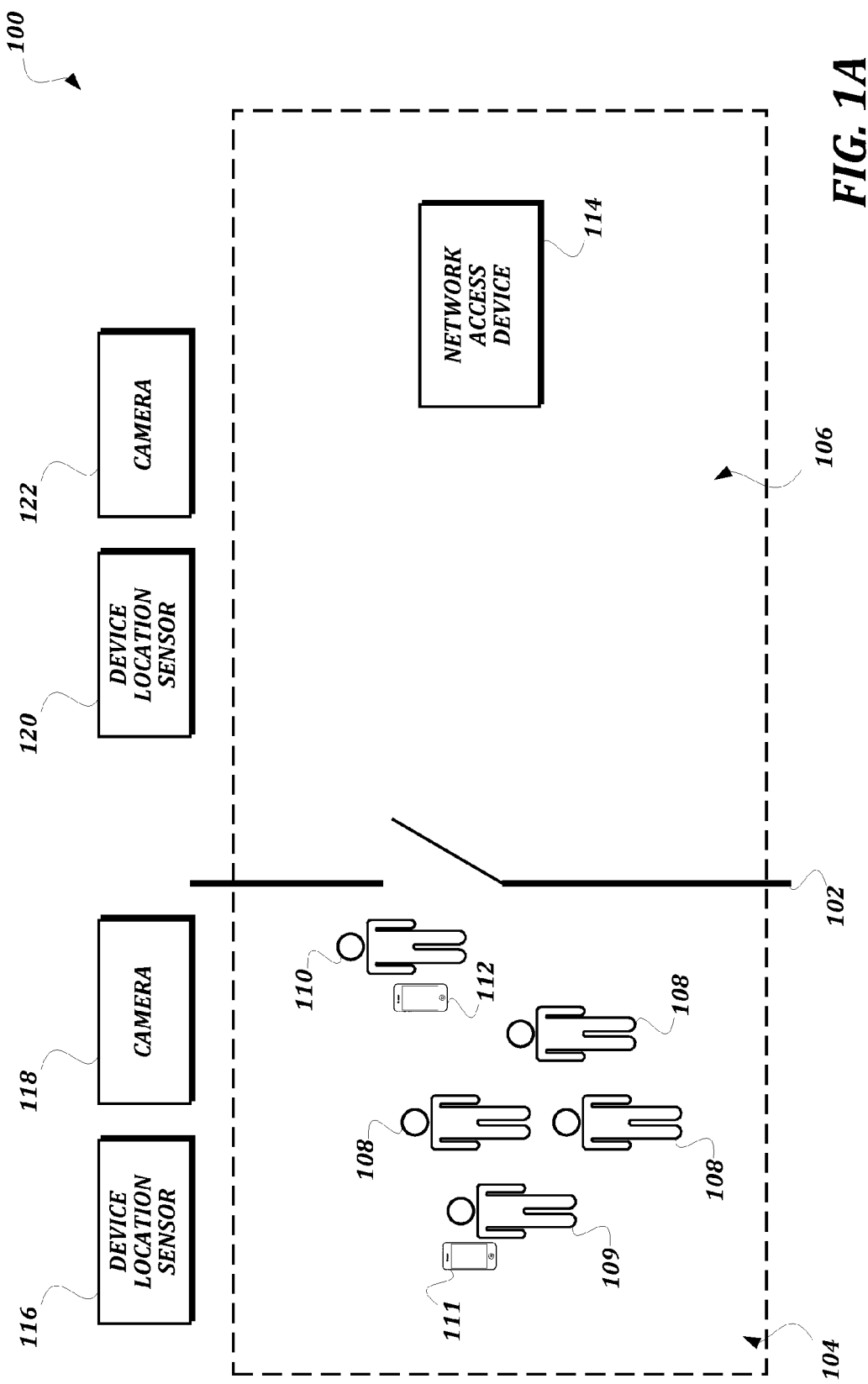
FIGS. 1A-1B are schematic diagrams that illustrate functionality of an exemplary embodiment of the present disclosure.
Figure 1B:
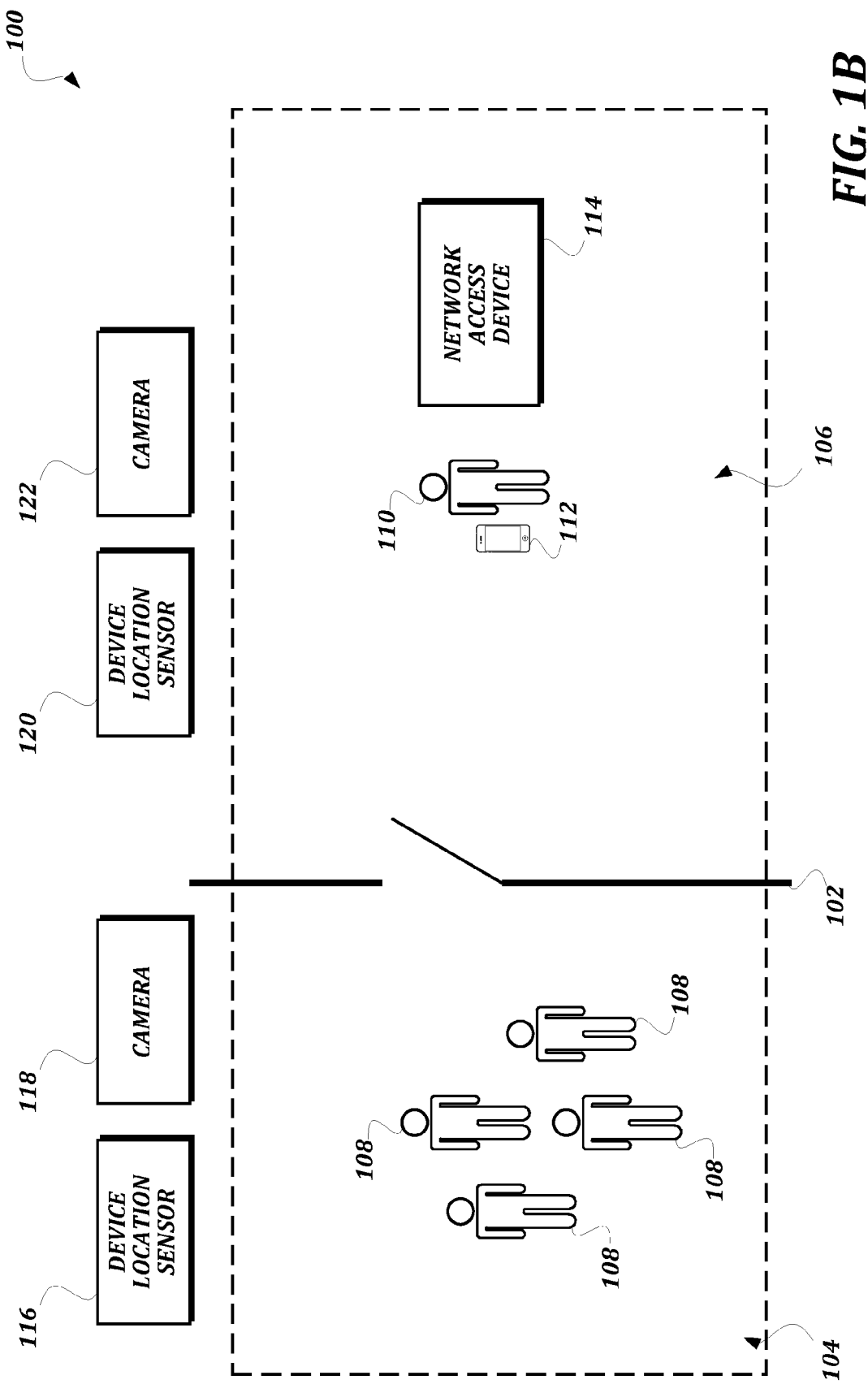

FIGS. 1A-1B are schematic diagrams that illustrate functionality of an exemplary embodiment of the present disclosure. Broadly, the embodiment illustrated in FIGS. 1A-1B is used to protect access to a physical location, such as with an electronic door lock, turnstile, man trap, and/or the like. One of ordinary skill in the art will recognize that this embodiment was used for ease of discussion, in that the physical protection of a secure area provides an easily described example. In some embodiments, access to something other than or in addition to a secure physical location is protected by the system, with or without a physical access control. One example of a secured resource protected by the system is a physical location, while other non-limiting examples include a secured network, a secured database, and a secured digital financial transaction.

As illustrated in FIG. 1A, an access location 106 is established within which the secured resource may be accessed. The access location 106 may also be referred to as the area within an access boundary. In some embodiments, the access location 106 itself may be the secured resource, such as for a room protected by a door 102 with an electronic lock, as illustrated in the figures). In some embodiments, the access location 106 may be a location from which a secured resource may physically be accessed, such as through network access device 114 illustrated within the access location 106.

Along with the access location 106, a physical location 104 proximate to the access location is also established. As with the access location 106, the physical location 104 may also be referred to as an area within a boundary proximate to the access location. The access location 106 and the physical location 104 proximate to the access location 106 may be of any size. For example, a facility for which access is controlled can range in size from an entire military installation, to particular floors of a multi-floor building, to a small telephony access closet, to a single kiosk or terminal. In some embodiments, the physical location 104 proximate to the access location may be established in an area through which a user is likely to pass while on their way to the access location 106. For example, the physical location 104 proximate to the access location may be a hallway or lobby leading to an electronically locked door, a public street near a protected building, an interior of a bank, an area outside of a user's home, and/or the like. In some embodiments, the physical location 104 proximate to the access location is established in such a way that the system will have adequate time to authenticate the user by the time the user reaches the access location 106, thus making the authentication process seem instantaneous to the user upon the user's attempt to access a secured resource from the access location 106.

In some embodiments, the system includes one or more device location sensors 116 and one or more cameras 118 configured to monitor the physical location 104 proximate to the access location. Further descriptions of the device location sensors 116, the cameras 118, and their functionality are provided below, but broadly, the device location sensors 116 are configured to detect the presence of mobile computing devices within the physical location 104 proximate to the access location. Once a device location sensor 116 detects the presence of a given mobile computing device, the cameras 118 begin capturing images to recognize a face of a user associated with the given mobile computing device. If the cameras 118 can find a face that matches the user, access through the door 102 will be granted and the user will be able to enter the access location 106.

In some embodiments of the present disclosure, the system is optimized such that the device location sensors 116 and the cameras 118 are able to authenticate users, even in crowds. As illustrated, user 110 is authorized to access the access location 106, and is associated with mobile device 112. Other individuals, such as individuals 108, may be present in the physical location 104 proximate to the access location. In addition, other individuals 109 having computing devices 111 may also be within the physical location 104 proximate to the access location. In some embodiments, the device location sensors 116 are able to differentiate the authorized computing device 112 in the possession of the authorized user 110 from the unauthorized computing device 111 in the possession of individual 109, and access will be provided to the authorized user 110 and not the unauthorized individual 109.

FIG. 1B illustrates a situation where the authorized user 110 is present within the access location 106. In some embodiments, one or more device location sensors 120 and cameras 122 are configured to monitor the access location 106. Accordingly, the device location sensors 120 and the cameras 122 can determine if the user 110, the mobile device 112, or both are still within the access location 106, or whether they have left the access location 106. If the device location sensors 120 and/or the cameras 122 have determined that one or both have left the access location 106 or have become separated from each other, then any access enabled by the system (such as through the network access device 114) may be disabled in order to prevent the initial authorization of the user 110 to be used by someone else who is not authorized.

Figure 2:
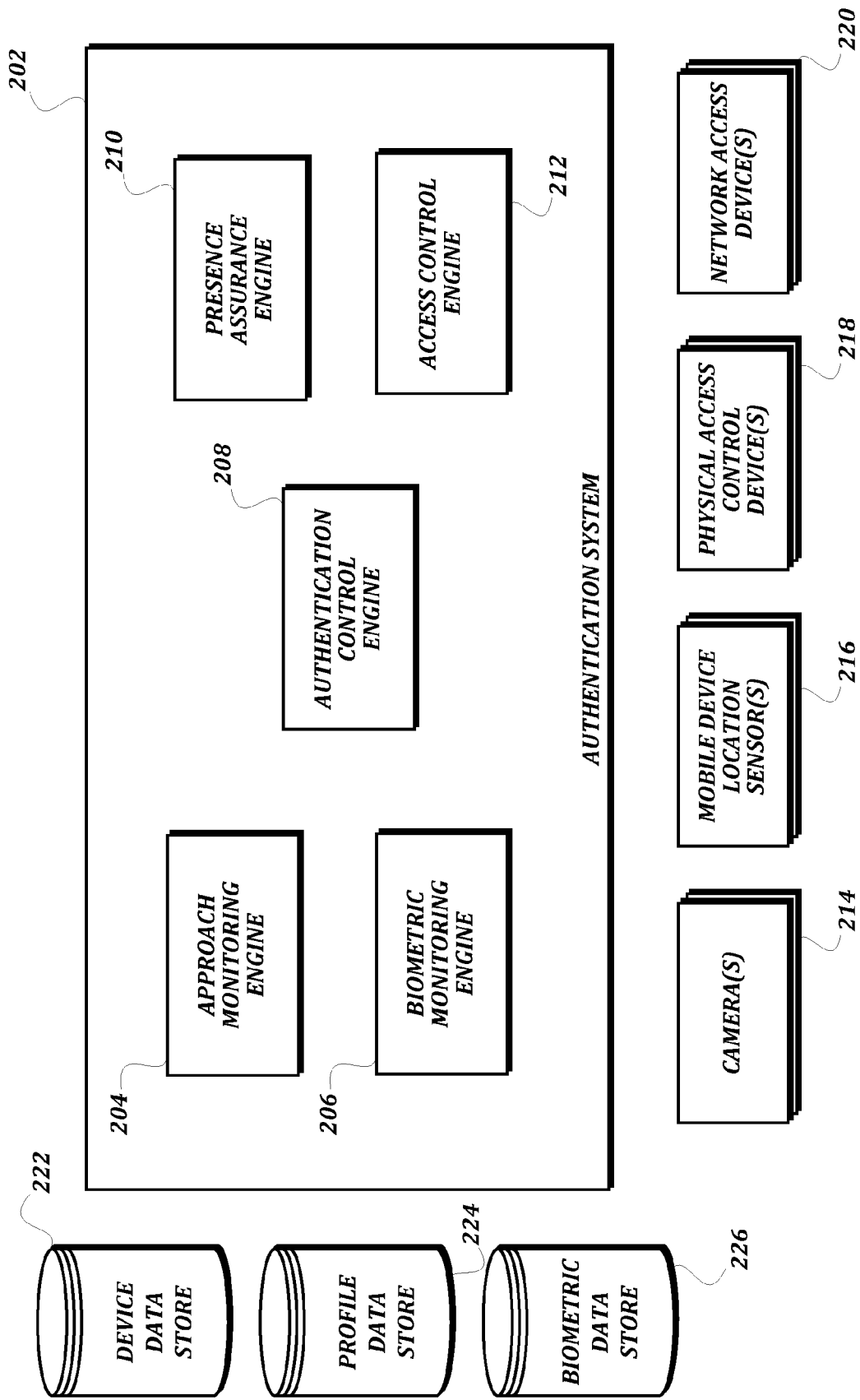
FIG. 2 is a block diagram that illustrates an exemplary embodiment of a system according to various aspects of the present disclosure.

FIG. 2 is a block diagram that illustrates an exemplary embodiment of a system according to various aspects of the present disclosure. As illustrated, the system includes an authentication system 202, one or more cameras 204, one or more mobile device location sensors 216, one or more physical access control devices 218, and one or more network access devices 220. In some embodiments, the cameras 214 may include a closed circuit television camera (CCTV) system present in a building or elsewhere. In some embodiments, the cameras 214 may include one or more cameras included with mobile devices, as described further below. In some embodiments, one or more of the cameras 214 may be capable of capturing images in different spectrums, such as in a visual spectrum or an infrared spectrum. In some embodiments, one or more of the cameras 214 may be combined with other sensors capable of retrieving depth information from the camera's field of view. The cameras 214 may capture video images, still images, or both.

In some embodiments, the mobile device location sensors 216 are configured to receive signals from mobile devices in the physical location 104 proximal to the access location, and to thereby determine their location. In some embodiments, the mobile device location sensors 216 detect a signal generated by the mobile device, and are able to determine the location of the mobile device based on the physical characteristics of the received signal (such as by triangulation and/or the like). The signal may be a Wi-Fi signal, a Bluetooth signal, an Active Radio Frequency Identification (RFID) signal, a UHF-RFID signal, a passive RFID signal transmitted in response to receipt of an interrogation signal, a near-field communication signal, and/or the like. In some embodiments, the mobile device location sensors 216 receive location information that is reported by the mobile device itself instead of using the physical characteristics of the signal. For example, the mobile device may form a Bluetooth connection to a mobile device location sensor 216, and may transmit location information obtained by a positioning sensor of the mobile device to the mobile device location sensor 216.

In some embodiments, one or more network access devices 220 are included within the access area 106. The system may be configured to enable and disable the one or more network access devices 220 based on the presence of an authorized user. For example, in the default for a network access device 220 such as a network port may be to be turned off. Upon detecting the presence of a user and confirming the user's identity, the network access device 220 may be turned on. Accordingly, the likelihood of an unwanted network access being made by an intruder via the network access device 220 is greatly diminished.

In some embodiments, one or more physical access control devices 218 are included in order to control admittance to the access location. Some non-limiting examples of such devices include electronically locks, man traps, and turnstiles. In some embodiments, the physical access control devices 218 may not themselves prevent access to the access location, but instead help inform a security guard regarding who is or is not authorized to enter the access location. For example, a physical access control device 218 may include a video display that shows at least a portion of the physical location 104 proximal to the access location. The location information may be used to determine which users displayed in the video display are authorized, and such information may be overlayed on top of the video display to easily illustrate to a security guard which users are authorized. As a further example, such information may be presented by a wearable device such as Google Glass and/or the like in an augmented reality format, such that the security guard would see the authorization information appear on top of users in the physical location 104 proximal to the access location in real time. In some embodiments, the physical access control devices 218 may be omitted entirely, such as when there are no physical barriers between the physical location 104 proximal to the access location and the access location 106 itself.

In the illustrated embodiment, the authentication system 202 includes one or more computing devices that are collectively configured to provide an approach monitoring engine 204, a biometric monitoring engine 206, an authentication control engine 208, a presence assurance engine 210, and an access control engine 212. In general, the term "engine" as used herein refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft.NET™ languages such as C#, and/or the like. An engine may be compiled into executable programs or written in interpreted programming languages. Software engines may be callable from other engines or from themselves. Generally, the engines described herein refer to logical modules that can be merged with other engines or applications, or can be divided into sub-engines. The engines can be stored in any type of computer-readable medium or computer storage device and be stored on and executed by one or more general purpose computers, thus creating a special purpose computer configured to provide the engine. In some embodiments, specialized hardware may be created in order to execute one or more functions of the engine.

In some embodiments, the approach monitoring engine 204 processes information from the cameras 214 and the mobile device location sensors 216 in order to determine when a user and a mobile device are present within the physical area 104 proximate to the access location. Once a mobile device associated with a given user is detected, the approach monitoring engine 204 prepares the remainder of the authentication system 202 to identify the given user based on images from the cameras 214. In some embodiments, the biometric monitoring engine 206 takes the images from the cameras 214 and compares them to biometric information for the given user associated with the mobile device detected by the approach monitoring engine 204. In some embodiments, the authentication control engine 208 controls the overall authentication process and handles encrypted communication with the mobile device and/or with the data stores. In some embodiments, the presence assurance engine 210 continually monitors the location of the mobile device and the identity of the user after access has been granted to determine when the access should be revoked. In some embodiments, the access control engine 212 enables or disables access to secured resources based on the instructions of the authentication control engine 208 and the presence assurance engine 210. Further description of the actions of each of these engines is provided below.

The illustrated system also includes a device data store 222, a profile data store 224, and a biometric data store 226. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store (unless otherwise explicitly required to be separate), and/or a single data store described herein may be separated into multiple data stores, without departing from the scope of the present disclosure.

In some embodiments, the device data store 222 is an encrypted data store of information related to registered devices. Each database row in the device data store 222 is identified by a row identifier that is generated by the system and is based on an encrypted hash of one or more device identifiers. In some embodiments, the profile data store 224 is an encrypted data store of non-biometric user data, such as user names, access control lists, and/or the like. Each database row in the profile data store 224 is identified by a row identifier that is generated by the system and is based on an encrypted hash of a profile identifier stored in the device data store 222. In some embodiments, the biometric data store 226 is an encrypted data store of biometric user data. Each database row in the biometric data store 226 is identified by a row identifier that is generated by the system and is based on an encrypted hash of a biometric identifier stored in the profile data store 224. In some embodiments, more than one biometric data store 226 may be available, and each separate biometric data store 226 may store information about a different biometric characteristic supported by the system. Further description of the data and usage of these data stores is provided below.

Figure 3:
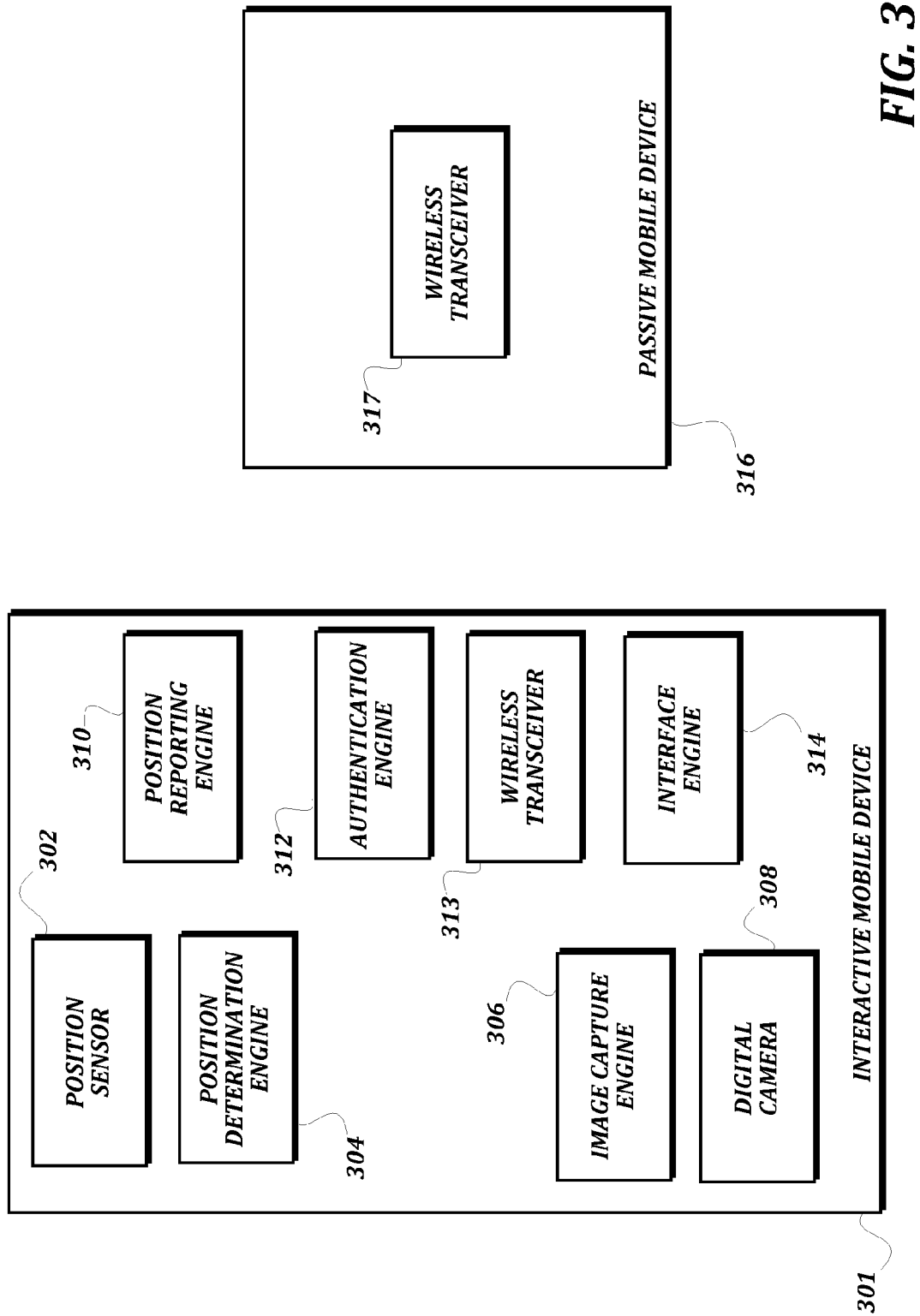
FIG. 3 is a block diagram that illustrates exemplary embodiments of an interactive mobile device and a passive mobile device according to various aspects of the present disclosure.

FIG. 3 is a block diagram that illustrates exemplary embodiments of an interactive mobile device 301 and a passive mobile device 316 according to various aspects of the present disclosure. In some embodiments, the interactive mobile device 301 may be a computing device that would normally be in the possession of users, such as a smart phone, a smart watch, a laptop computer, a tablet computer, and/or the like. As is known by one of ordinary skill in the art, such mobile devices include a variety of functionality, including geolocation abilities and image capture abilities. Accordingly, in some embodiments, the interactive mobile device 301 includes a position sensor 302 and a position determination engine 304. The position sensor 302, such as a GPS sensor and/or the like, receives signals that allow the geolocation of the mobile device 301 to be determined by the position determination engine 304. Also, in some embodiments, the interactive mobile device 301 includes a digital camera 308 that can capture images at the request of the image capture engine 306. The interactive mobile device 301 may also include a wireless transceiver 313. The wireless transceiver 313 may transmit signals such as Wi-Fi, Bluetooth, RFID, UHF-RFID, and/or the like that allow the mobile device location sensors 216 to detect the presence and location of the interactive mobile device 301. The wireless transceiver 313 may also form a data connection to the authentication system 202, through which the position reporting engine 310 may inform the authentication system 202 of the location of the interactive mobile device 301 as determined by the position determination engine 304.

The interactive mobile device 301 may be enrolled in the system, and an app may be installed on the interactive mobile device 301 to provide system-specific functionality such as the position reporting engine 310, the authentication engine 312, and the interface engine 314. Further description of this functionality is provided below. In some embodiments, the interactive mobile device 301 may not have all of the illustrated features. For example, in some embodiments, the interactive mobile device 301 may not have a position sensor 302, and the authentication system 202 will have to determine the position of the interactive mobile device 301 based on the characteristics of the emitted signals from the wireless transceiver 313. As another example, in some embodiments, the interactive mobile device 301 may not have a digital camera 308, and so the authentication system 202 will have to use images captured by the cameras 214 for identification.

In some embodiments, the mobile device may have only minimal functionality. FIG. 3 also illustrates a passive mobile device 316 according to various aspects of the present disclosure. The passive mobile device 316 merely includes a wireless transceiver 317. One example of a passive mobile device 316 is an electronic card key with an embedded RFID tag, though other examples also exist.

Figure 4A:
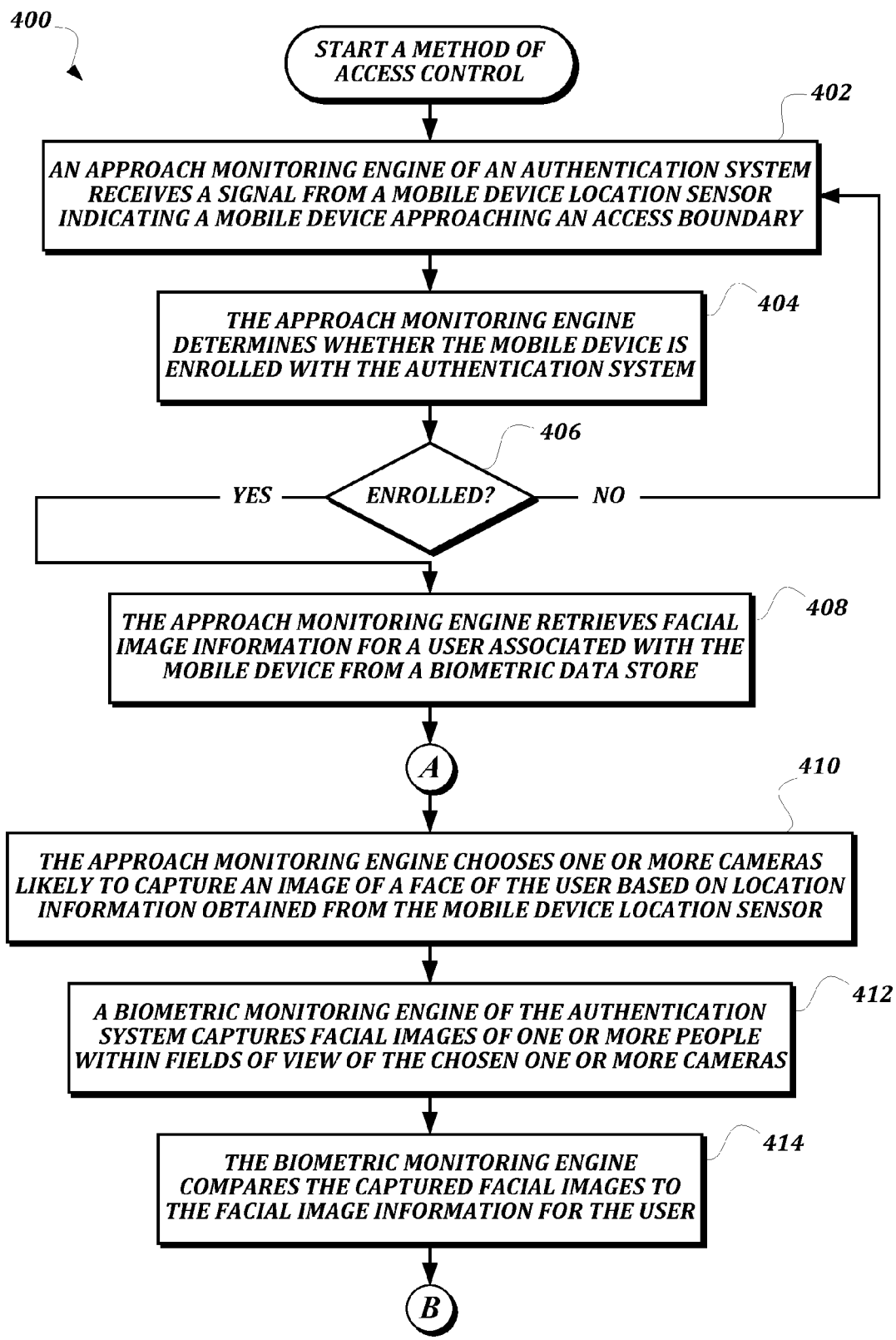
FIGS. 4A-4B are a flowchart that illustrates an exemplary embodiment of a method of access control according to various aspects of the present disclosure.
Figure 4B:
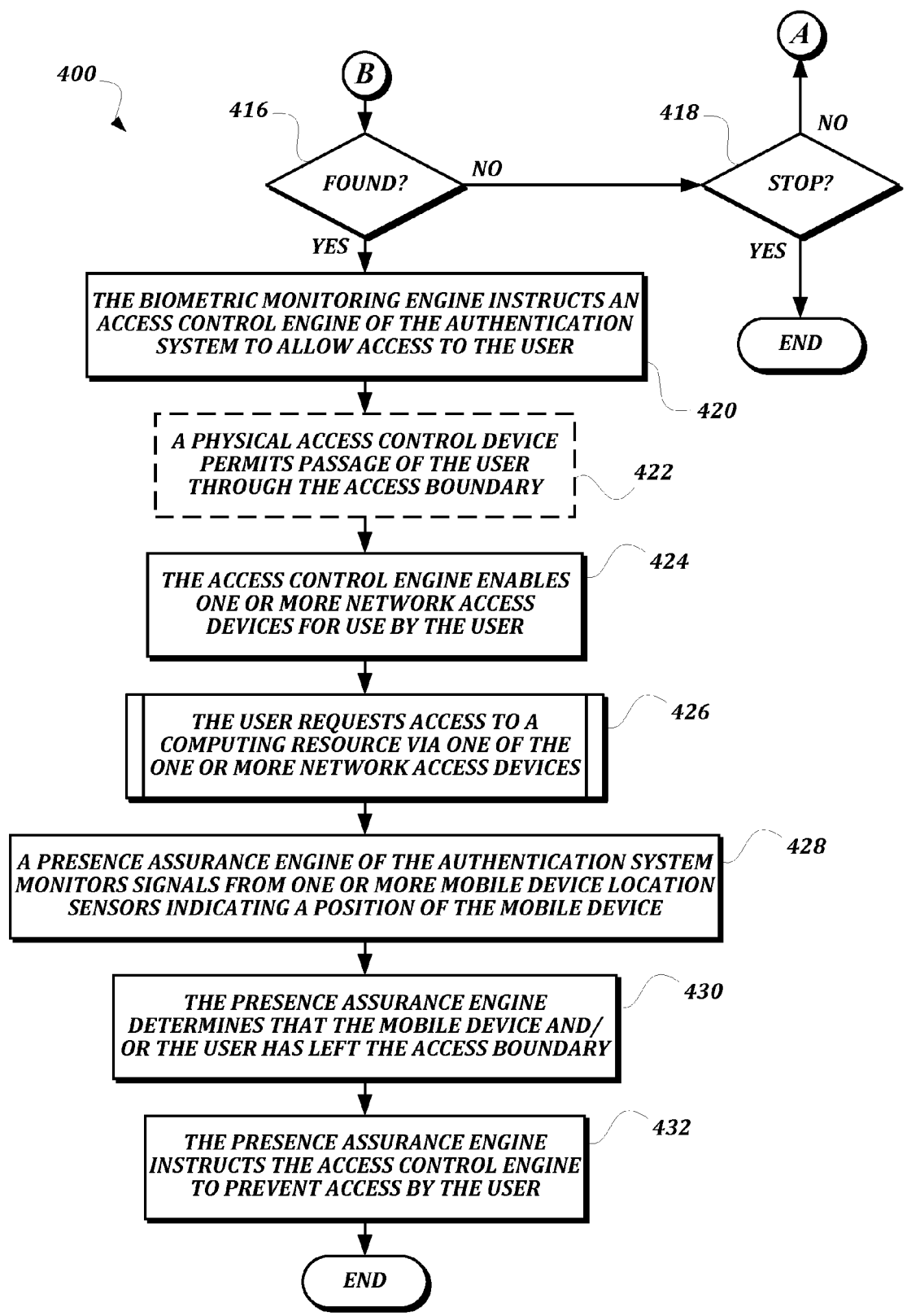

FIGS. 4A-4B are a flowchart that illustrates an exemplary embodiment of a method of access control according to various aspects of the present disclosure. The illustrated flowchart shows an overall process for a successful authentication. The failure cases have not been illustrated in the flowchart for ease of discussion, but one of ordinary skill in the art will recognize that at many points in the method 400, authentication or verification may fail, at which point the method 400 will terminate and the user 110 will not be given access to the requested resource.

From a start block, the method 400 proceeds to block 402, where an approach monitoring engine 204 of an authentication system 202 receives a signal from a mobile device location sensor 216 indicating a mobile device 112 approaching an access boundary. An example of this was illustrated in FIG. 1A and described above, wherein the mobile device 112 was detected within the physical area 104 proximate to the access location 106. In some embodiments, the mobile device location sensors 216 use the physical properties of a signal emitted by the mobile device 112 (such as signal strength and/or the like) to triangulate the position of the mobile device 112. In some embodiments, the mobile device location sensors 216 may receive data from the mobile device 112 that includes location information determined by the position determination engine 304 of the mobile device 112 itself. In some embodiments, the mobile device location sensors 216 may receive and report both types of information to the approach monitoring engine 204.

Next, at block 404, the approach monitoring engine 204 determines whether the mobile device 112 is enrolled with the authentication system 202. In some embodiments, the physical area 104 proximate to the authentication boundary is publicly accessible, such as a lobby, a mall, a public street, and/or the like, and the mobile device 112 is a commonly available device such as an iPhone, Android Phone, Windows Phone, and/or the like. In such embodiments, then mobile devices 109 of passers-by who are not may be detected by the mobile device location sensor 216. Accordingly, the approach monitoring engine 204 is configured to obtain at least one unique identifier of the mobile device such as a MAC address, an IMEI number, a Bluetooth identifier, a SIMM ICC-ID, an identifier stored on an RFID tag, and/or the like. In some embodiments, at least two unique identifiers are obtained from the mobile device 112 in order to reduce the possibility that one of the identifiers has been spoofed. In some embodiments, the mobile device location sensors 216 are able to passively obtain the unique identifiers of the mobile device 112 from the signals transmitted by the mobile device 112, such as a WiFi probe request, a response to a Bluetooth pairing request, and/or the like. In some embodiments, the mobile device location sensor 216 actively requests the identifiers from the mobile device 112, and/or the authentication engine 312 of the mobile device 301 actively transmits the identifiers from the mobile device 301 to the mobile device location sensor 216.

The method 400 then proceeds to a decision block 406, where a decision is made based on the determination of whether the detected mobile device is enrolled with the authentication system 202. In some embodiments, the approach monitoring engine 204 may determine this by attempting to use the device identifier to retrieve device information from the device data store 222, and checking to see if the device information indicates that the mobile device 112 is enrolled. If the mobile device is not enrolled with the authentication system 202, then the result of the determination at decision block 406 is NO, and the method 400 returns to block 402 to await detection of a subsequent mobile device.

Otherwise, if the mobile device 112 is enrolled with the authentication system 202, then the result of the determination at decision block 406 is YES, and the method 400 proceeds to block 408, where the approach monitoring engine 204 retrieves facial image information for a user 110 associated with the mobile device 112 from a biometric data store 226. In some embodiments, the approach monitoring engine 204 uses the device identifier (or information retrieved using the device identifier from the device data store 222) to only retrieve facial image information relevant to the user 110 associated with the mobile device 112. The limiting of the facial image information used helps increase the efficiency of the method 400.

The method 400 then passes through a continuation terminal ("terminal A") and then to block 410, where the approach monitoring engine 204 chooses one or more cameras 214 likely to capture an image of a face of the user 110 based on location information obtained from the mobile device location sensor 216. In some embodiments, the approach monitoring engine 204 is configured with data that represents the fields of view of each of the cameras 214, and may choose a camera having a field of view that includes either the current location of the mobile device 112 or a predicted future location of the mobile device 112 (such as a location between the mobile device 112 and the access boundary, or a location in the direction of travel of the mobile device 112). In some embodiments, particularly in embodiments wherein several fields of view overlap from different directions, the approach monitoring engine 204 may choose a camera with a field of view likely to contain user's face, such as a camera in the direction of travel of the mobile device 112 (as opposed to a camera likely to only see the user's back by virtue of being away from the direction of travel). In some embodiments, the approach monitoring engine 204 may choose the camera 308 of the mobile device 301 itself. In such embodiments, the interface engine 314 may present a prompt the user 110 to capture the image of themselves and transmit it to the authentication system 202.

At block 412, a biometric monitoring engine 206 of the authentication system 202 captures facial images of one or more people within fields of view of the chosen one or more cameras 214, and at block 414, the biometric monitoring engine 206 compares the captured facial images to the facial image information for the user 110. In some existing systems for facial recognition within crowds, a many-to-many comparison is performed wherein all of the facial image data for every user must be searched against all of the captured facial images. These existing systems do not scale to large numbers of registered users and large numbers of facial images, because too many comparisons must be made in order to return a result in a timely manner. Embodiments of the present disclosure are superior because the number of comparisons is limited to the facial image data captured by cameras that are likely to contain the facial image of interest, to only the facial image information for the user 110. This smaller number of comparisons allows results to be returned in a timely manner, even when used to authenticate users when in crowds. In some embodiments, the efficiencies may be extended even further by obtaining detailed spatial location information for the mobile device 112, so that facial images that correspond only to that spatial location may be considered (as opposed to all facial images within the field of view of the chosen camera).

The method 400 then proceeds to a continuation terminal ("terminal B"). From terminal B (FIG. 4B), the method 400 proceeds to a decision block 416, where a determination is made based on whether the biometric monitoring engine 206 found a captured facial image that matches the facial image information for the user 110. The biometric monitoring engine 206 may use any suitable facial recognition algorithm known in the art, including but not limited to a Principal Component Analysis, a Linear Discriminate Analysis, Elastic Bunch Graph Matching, a Hidden Markov model, dynamic link matching, or any other suitable algorithm. If a captured facial image did not match the facial image information for the user 110, then the result of the determination at decision block 416 is NO, and the method 400 proceeds to a decision block 418. At decision block 418, a determination is made based on whether the method 400 should continue looking for the user 118. In some embodiments, a certain number of iterations may be performed before it is determined that the method 400 should stop looking for the user. In some embodiments, a time limit from the time the mobile device 112 is first detected within the physical area 104 proximate to the access location is considered to determine whether the method 400 should stop looking for the user. In some embodiments, it may be determined that the method 400 should continue looking for the user as long as the mobile device 112 is still detected within the physical area 104 proximate to the access location. If the result of the determination at decision block 418 is NO, then the method 400 will continue looking for a captured facial image of the user, and returns to terminal A. If the result of the determination at decision block 418 is YES, then the method 400 stops looking for the captured facial image of the user, proceeds to an end block, and terminates.

Otherwise, back at decision block 416, if a captured facial image did match the facial image information for the user 110, then the result of the determination at decision block 416 is YES. At this point, the method 400 has determined that user associated with the mobile device 112 is actually present, and so it is safe to allow access to the user 110. Accordingly, the method 400 proceeds to block 420, where the biometric monitoring engine 206 instructs an access control engine 212 of the authentication system 202 to allow access to the user 110. In some embodiments, this may result in access immediately being granted to the user 110. In some embodiments, this may result in the authentication system 202 recording that a later request for access (such as the presentation of a cardkey or an attempt to log in to a network access device 114) should be allowed to proceed.

From block 420, the method 400 proceeds to optional block 422, where a physical access control device 218 permits passage of the user 110 through the access boundary, per the instruction of the access control engine 212. The actions described with respect to block 422 are optional, because not every embodiment includes a physical control at the access boundary. At block 424, the access control engine 212 enables one or more network access devices 220 for use by the user 110. In some embodiments, the network access device 220 may include a network access port, a wireless router, a power outlet, and/or the like, and enablement thereof may include turning the network access device 220 on.

At procedure block 426, the user 110 requests access to a computing resource via one of the one or more network access devices 220. In some embodiments, the computing resource may be a network resource (such as a file server, a database, a web site, and/or the like), a secure financial transaction, or any other secured computing resource. The authentication control engine 208 may authenticate the user for access using any suitable technique. An example technique that provides even further assurances that only authorized users who have been duly identified may access the secured resource is illustrated described below with respect to FIGS. 5A-5C.

Once the user 110 has been given access, the authentication system 202 continues to monitor the user 110 to ensure that the user 110 should still be allowed access. This can help prevent against people other than the user 110 being able to tailgate or otherwise use the access that was properly provided to the user 110 in the user's absence. Accordingly, the method 400 proceeds to block 428, where a presence assurance engine 210 of the authentication system 202 monitors signals from one or more mobile device location sensors 216 indicating a position of the mobile device 112. At block 430, the presence assurance engine 210 determines that the mobile device 112 and/or the user 110 has left the access boundary. In some embodiments, the location of the mobile device 112 is monitored by the device location sensors 120 using a technique similar to that described above for the physical location 104 proximate to the access location. In some embodiments, the presence of the identified user 110 may be monitored by the cameras 122 using facial images using a technique similar to that described above, as well. In some embodiments, the presence assurance engine 210 may require that the user 110 and the mobile device 112 remain together as well. In other words, a distance between a location of the mobile device 112 and the user 110 may be determined, and a separation of more than a threshold distance would be considered leaving the access boundary.

Once the presence assurance engine 210 has determined that access should be revoked, the method 400 proceeds to block 432, where the presence assurance engine 210 instructs the access control engine 212 to prevent access by the user 110. The access control engine 212 subsequently will revoke the permissions provided to the one or more network access devices 220 and, optionally, the physical access control devices 218. The method 400 then proceeds to an end block and terminates.

Figure 5A:
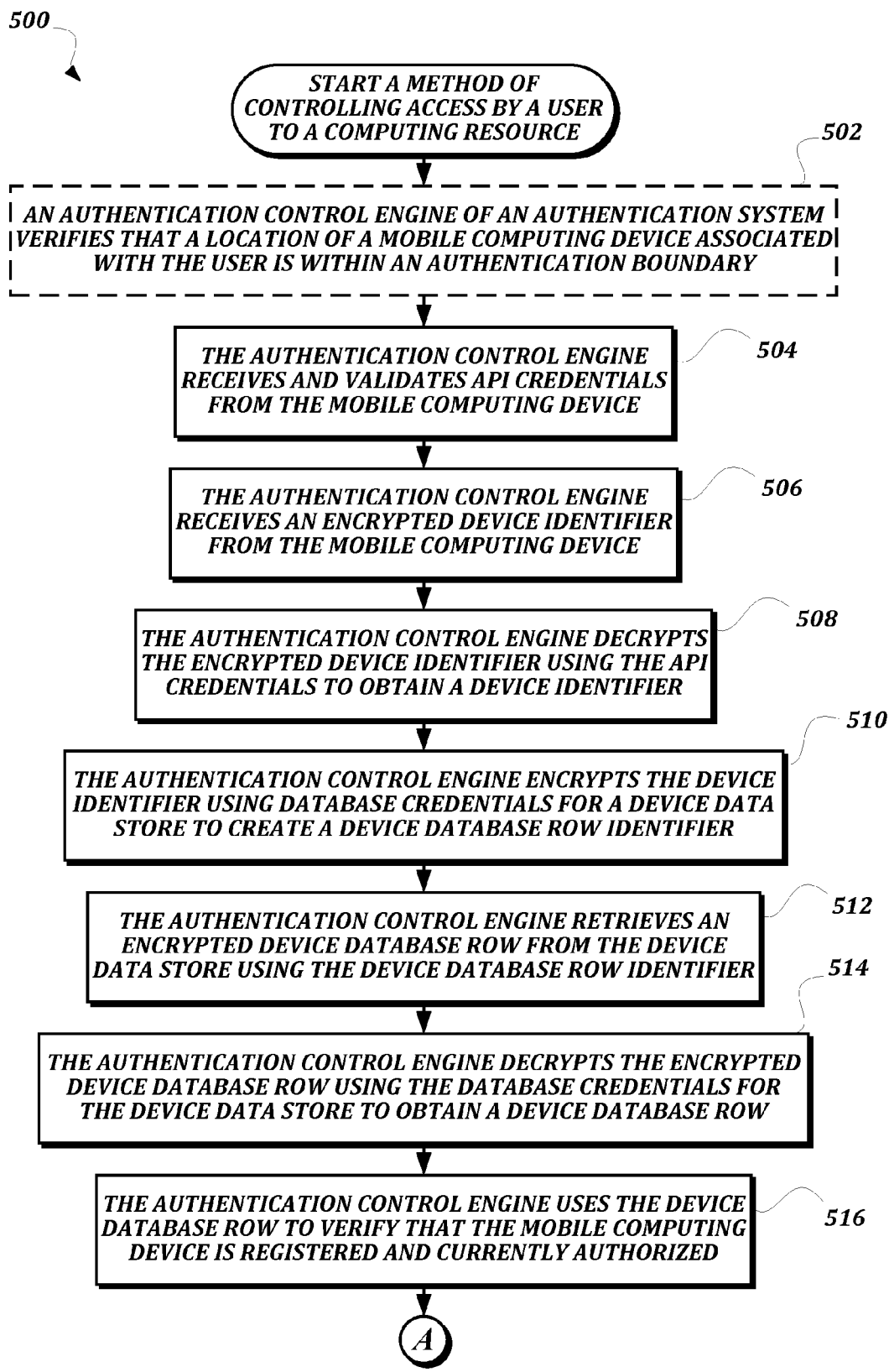
FIGS. 5A-5C are a flowchart that illustrates an exemplary method of controlling access by a user to a computing resource according to various aspects of the present disclosure.
Figure 5B:
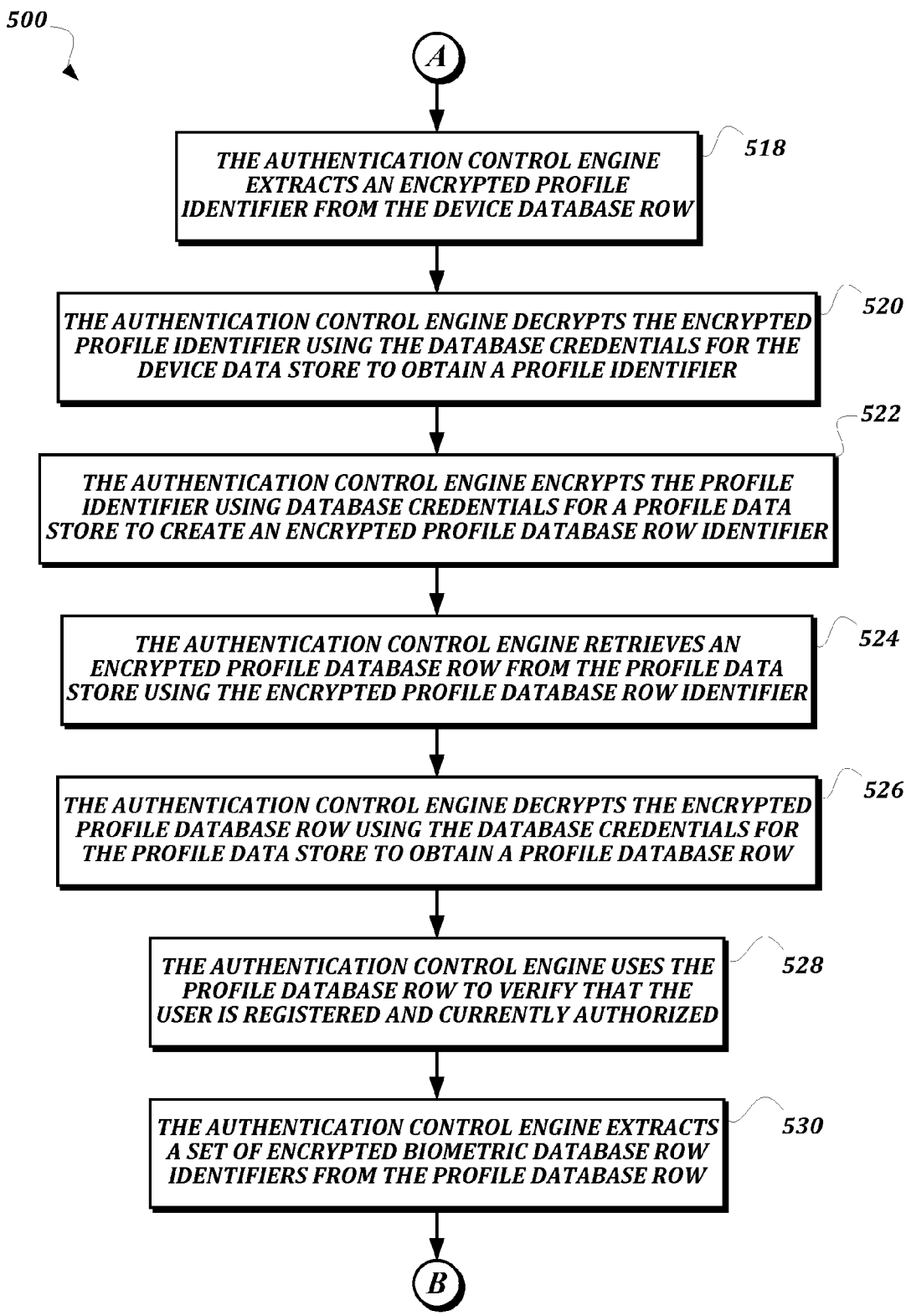
Figure 5C:
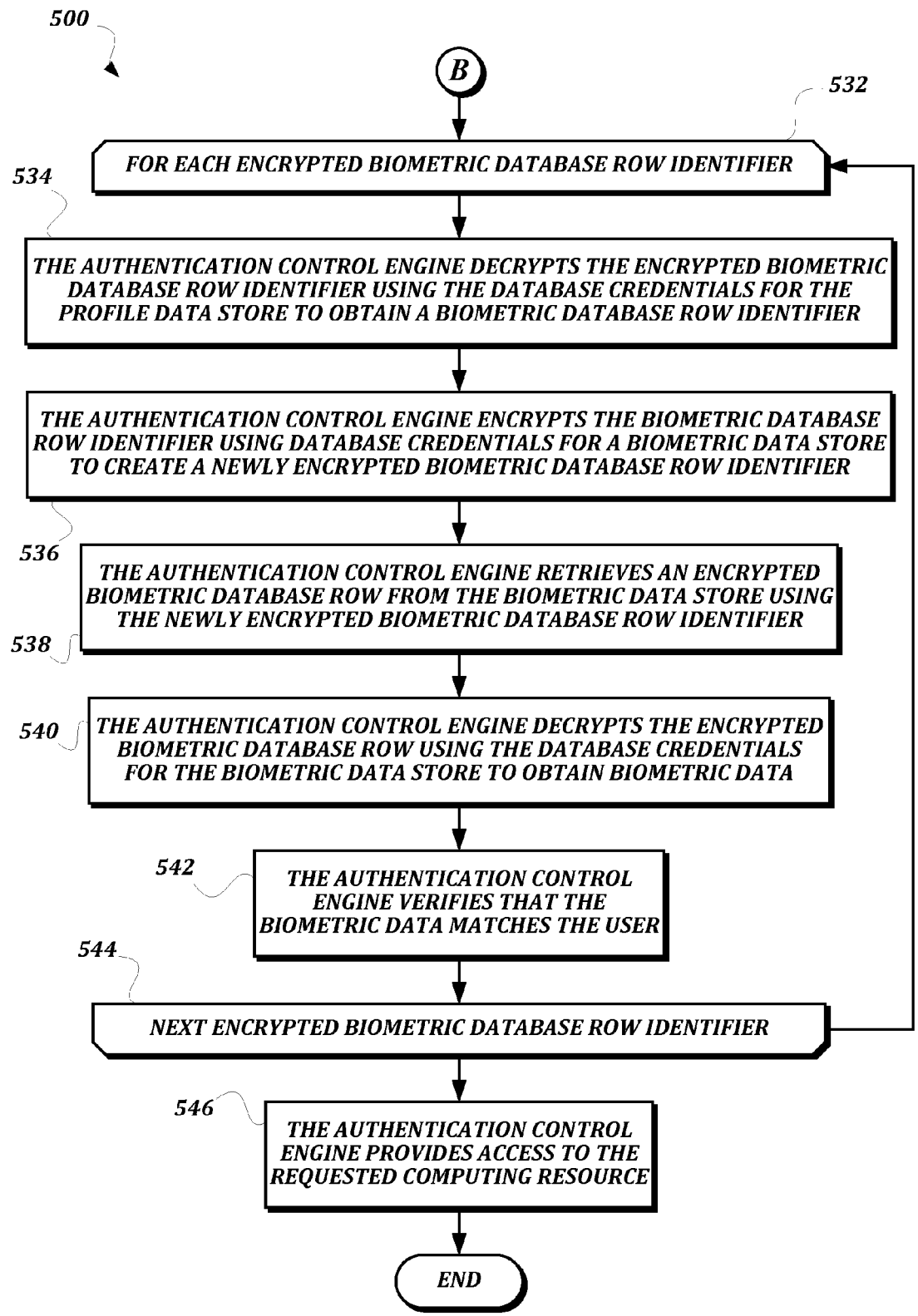

FIGS. 5A-5C are a flowchart that illustrates an exemplary method of controlling access by a user to a computing resource according to various aspects of the present disclosure. The method 500 illustrated in FIGS. 5A-5C is an example of a suitable method for use at procedure block 426, and in some embodiments, may be used independently for user authentication. In general, the method 500 uses a cascading authentication process to verify three security characteristics: What (what device is being presented as the authentication initiator, and is it a registered and authorized device?), Why (why should the owner associated with the device be granted authentication? Does the owner have current permission levels that allow the requested access?), and Who (is the user's identity claim valid?). Once all three characteristics have been confirmed, the user-device authentication pair is validated. Separate parts of the system used for authentication are both isolated from each other and rely on each other, so access will remain secure unless all parts of the system are compromised together.

From a start block, the method 500 proceeds to optional block 502, where an authentication control engine 208 of an authentication system 202 verifies that a location of a mobile computing device 112 associated with the user 110 is within an authentication boundary. In some embodiments, the authentication boundary is the same as the access boundary 106 discussed above. In some embodiments, the authentication boundary may be larger or smaller than the access boundary 106, such as being confined to an area around a particular network access device 114 such as a workstation, a kiosk, an ATM, and/or the like. The actions of block 502 are optional because in some embodiments, the location of the computing device 112 is not monitored as part of the authentication process. In some embodiments when the actions of block 502 are performed, the location of the computing device 112 may continue to be monitored throughout the authentication process to ensure that the user has not left the authentication boundary, similar to the location monitoring discussed above.

The method 500 then proceeds to block 504, where the authentication control engine 208 receives and validates API credentials from the mobile computing device 112. API credentials are used by the authentication engine 312 on the mobile device 301 to interact with the authentication system 202. In some embodiments, the API credentials include a public/private key pair, and the mobile computing device 112 is provided with the public key. At block 506, the authentication control engine 208 receives an encrypted device identifier from the mobile computing device 112. The device identifiers are encrypted both to ensure that they are not exposed in transit, and to ensure the identity of both the mobile device 112 and the authentication system 202 (transmitting the encrypted device identifiers to a different or malicious system would not cause them to be exposed, because the malicious system would not have the private key needed to decrypt the encrypted identifier.

Next, at block 508, the authentication control engine 208 decrypts the encrypted device identifier using the API credentials to obtain a device identifier. In some embodiments, the encrypted device identifier is an encryption hash composed of two unique device identifiers assigned to the mobile device 112 (such as a MAC address, an IMEI identifier, and/or the like as discussed above) and encrypted using the public key of the API credentials. Any suitable encryption algorithm that uses the public key of the API credentials may be used to encrypt the identifiers, and the private key of the API credentials may be used by the authentication control engine 208 to decrypt the identifiers.

At block 510, the authentication control engine 208 encrypts the device identifier using database credentials for a device data store 222 to create a device database row identifier. In some embodiments, the database credentials for the device data store 222 include a public/private key pair associated with the device data store 222, and the authentication control engine 208 uses the public key to create the device database row identifier. Next, at block 512, the authentication control engine 208 retrieves an encrypted device database row from the device data store 222 using the device database row identifier. In some embodiments, the device data store 222 may directly use the device database row identifier to identify and retrieve the encrypted device database row. In some embodiments, the device data store 222 may decrypt the device database row identifier using a private key of the public/private key pair associated with the device data store 222 before using it to retrieve the encrypted device database row.

At block 514, the authentication control engine 208 decrypts the encrypted device database row using the database credentials for the device data store to obtain a device database row. In some embodiments, the authentication control engine 208 decrypts the encrypted device database row using the private key of the database credentials for the device data store 222. In some embodiments, the device database row includes information that identifies the device, permissions that are assigned to the device (such as valid access locations and/or the like), registration status, and/or the like. The method 500 then proceeds to block 516, where the authentication control engine 208 uses the device database row to verify that the mobile computing device 112 is registered and currently authorized. In some embodiments, the mere existence of the device database row that matches or includes the device identifier may indicate that the mobile device 112 is registered and currently authorized. In some embodiments, the device database row may indicate a validity period which will be checked by the authentication control engine 208 before verifying authorization.

The method 500 then proceeds to a continuation terminal ("terminal A"), and from terminal A (FIG. 5B) to block 518, where the authentication control engine 208 extracts an encrypted profile identifier from the device database row. Because the encrypted profile identifier is stored in the device data store 222 instead of being accessible to the mobile computing device 112, an extra layer of security is provided by isolating the profile information from the mobile computing device 112. That is, there is no way for the mobile computing device 112 to access the profile information without first negotiating access to the device data store 222.

At block 520, the authentication control engine 208 decrypts the encrypted profile identifier using the database credentials for the device data store 222 to obtain a profile identifier. In some embodiments, the private key of the database credentials for the device data store 222 may be used to decrypt the encrypted profile identifier. Next, at block 522, the authentication control engine 208 encrypts the profile identifier using database credentials for a profile data store 224 to create an encrypted profile database row identifier. In some embodiments, the database credentials for the profile data store 224 include a public/private key pair, and the profile identifier is encrypted using the public key of profile data store 224. One of ordinary skill in the art will notice that the profile identifier is obtained using the database credentials for the device data store 222, and then encrypted for use with the profile data store 224 using the database credentials for the profile data store 224. The only party with access to both database credentials is the authentication control engine 208. Hence, the device data store 222 is isolated from the profile data store 224, and so obtaining data from one will not provide any meaningful access to the other because the database credentials will need to be obtained as well.

At block 524, the authentication control engine 208 retrieves an encrypted profile database row from the profile data store 224 using the encrypted profile database row identifier. Similar to the above discussion, the profile data store 224 may use the encrypted profile database row identifier itself to identify the profile database row to be returned, or may decrypt the encrypted profile database row using its private key in order to use the profile database row identifier to identify the profile database row to be returned.

At block 526, the authentication control engine 208 decrypts the encrypted profile database row using the database credentials for the profile data store 224 to obtain a profile database row. In some embodiments, the encrypted profile database row is decrypted using the private key of the database credentials for the profile data store 224. The method 500 then proceeds to block 528, where the authentication control engine uses the profile database row to verify that the user 110 is registered and currently authorized. As above, in some embodiments the mere existence of the row could show authorization. In some embodiments, the profile database row may include authorization times, an expiration period, an authorization flag, access control lists for particular resources, and/or the like, to be used to verify that the user is registered and currently authorized.

Once the method 500 completes block 528, it has been determined that the device 112 is authorized by the system and that the user 110 associated with the device is authorized to access the requested resource. What remains is for the method 500 to verify the identity of the user 110 as actually being the person currently interacting with the system and possessing the device 112. Accordingly, the method 500 proceeds to block 530, where the authentication control engine 208 extracts a set of encrypted biometric database row identifiers from the profile database row. In some embodiments, more than one type of biometric information may be used to verify the identity of the user 110, and each type of biometric information may be housed in a different biometric data store 226 having its own database credentials.

From block 530, the method 500 proceeds to a continuation terminal ("terminal B"), and from terminal B (FIG. 5C) to a for loop 532-544 defined between a for loop start block 532 and a for loop end block 544. Within the for loop 532-544, actions are performed to process each of the encrypted biometric database row identifiers in the set of encrypted biometric database row identifiers from the profile database row.

From the for loop start block 532, the method 500 proceeds to block 534, where the authentication control engine 208 decrypts the encrypted biometric database row identifier using the database credentials for the profile data store 224 to obtain a biometric database row identifier. In some embodiments, the encrypted biometric database row identifier is decrypted using the private key of the database credentials for the profile data store 224. At block 536, the authentication control engine 208 encrypts the biometric database row identifier using database credentials for a biometric data store 226 to create a newly encrypted biometric database row identifier. In some embodiments, the database credentials for the biometric data store 226 include a public/private key pair, and the biometric database row identifier is encrypted using the public key. In some embodiments, the profile database row may also include an indication of which biometric data store 226 the biometric database row identifier refers to, which may be used to find the correct biometric data store 226 and to find the associated database credentials.

At block 538, the authentication control engine 208 retrieves an encrypted biometric database row from the biometric data store 226 using the newly encrypted biometric database row identifier. As above, the biometric data store 226 may use the newly encrypted biometric database row identifier itself to identify the row, or may decrypt the newly encrypted biometric database row identifier using its private key to obtain the biometric database row identifier. At block 540, the authentication control engine 208 decrypts the encrypted biometric database row using the database credentials for the biometric data store 226 (for example, using the private key of the database credentials for the biometric data store 226) to obtain biometric data. As with the separation between the device data store 222 and the profile data store 224, accessing the biometric data in the biometric database row requires having both the database credentials for the profile data store 224 (to retrieve the biometric database row identifier) and for the biometric data store 226 (to re-encrypt the biometric database row identifier and to decrypt the encrypted biometric database row), and the only entity with access to both sets of database credentials is the authentication control engine 208. Thus, a security compromise in either of the data stores does not expose the other, thereby improving overall security.

The biometric data stored in the biometric data store 226 may be facial image data as described above, or any other suitable type of biometric information, such as fingerprint data, iris scan data, a password, a palm vein pattern, a DNA sequence, a retinal pattern, a voice print, and/or the like. At block 542, the authentication control engine 208 verifies that the biometric data matches the user 110. In some embodiments, the authentication control engine 208 may cause a request for biometric input to be presented, either by the mobile device 301, by another specialized device configured to obtain the biometric input, or both. In some embodiments, the authentication control engine 208 may automatically obtain the biometric input from a camera 214 without user interaction, as discussed above.

Assuming the authentication control engine 208 determined that the biometric input matched the biometric data, the method 500 then proceeds to the for loop end block 544. If further encrypted biometric database row identifiers remain to be processed from the set of encrypted biometric database row identifiers, then the method 500 returns to the for loop start block 532 to process the next encrypted biometric database row identifier. Otherwise, if the entire set of encrypted biometric database row identifiers has been processed without any errors, then the method 500 proceeds to block 546, where the authentication control engine 208 provides access to the requested computing resource. The method 500 then proceeds to an end block and terminates.

Figure 6:
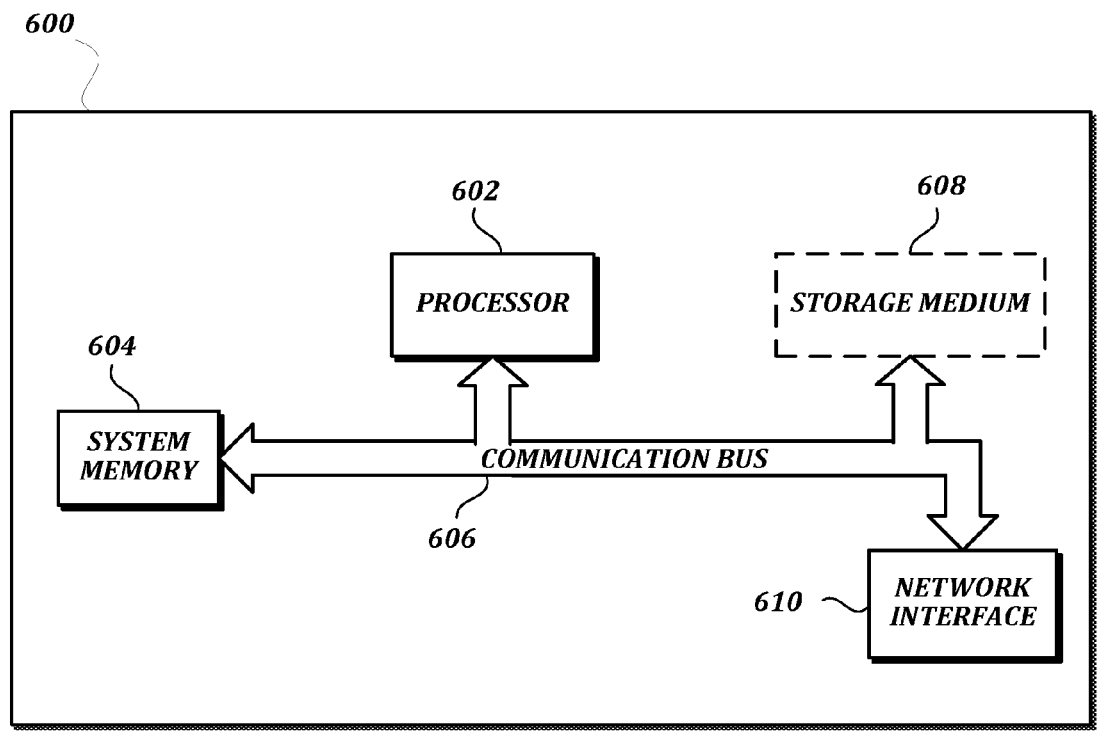
FIG. 6 is a block diagram that illustrates aspects of an exemplary computing device appropriate for use as a computing device of the present disclosure.

FIG. 6 is a block diagram that illustrates aspects of an exemplary computing device 600 appropriate for use as a computing device of the present disclosure. While multiple different types of computing devices were discussed above, the exemplary computing device 600 describes various elements that are common to many different types of computing devices. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data.

In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used.

While illustrative embodiments have been illustrated and described, it will be appreciated that various changes can be made therein without departing from the spirit and scope of the invention.

The embodiments of the invention in which an exclusive property or privilege is claimed are defined as follows:

1. An identity validation system for positively confirming an identity and a physical location of an individual for securing access to one or more secured resources, the system comprising:
    one or more location sensors for detecting locations of mobile devices within a physical location proximate to an access location for the one or more secured resources;
    one or more cameras for monitoring the physical location proximate to the access location;
    a facial recognition data store configured to store one or more facial data records; and
    at least one security management computing device configured to:
        receive a notification from the one or more location sensors indicating that a mobile device is detected within the physical location and is approaching the access location;
        in response to determining that the mobile device is enrolled with the security system, retrieve a facial data record from the facial recognition data store associated with a user associated with the mobile device;
        compare the facial data record to images of faces captured by the one or more cameras; and provide access to the one or more secured resources in response to determining that the facial data record matches an image of a face captured by the one or more cameras.

2. The system of claim 1, wherein the one or more cameras include a plurality of cameras each having a different field of view, and wherein comparing the facial data record to images of faces captured by the one or more cameras includes choosing a camera from the plurality of cameras having a field of view that includes a location of the detected mobile device.

3. The system of claim 2, wherein choosing a camera from the plurality of cameras having a field of view that includes the location of the detected mobile device includes:
   determining a direction of movement of the detected mobile device; and
   choosing a camera from the plurality of cameras that is located in the direction of movement.

4. The system of claim 1, wherein the one or more secured resources include a secured physical location, wherein the system further comprises a physical access control device configured to selectively allow access to the secured physical location, wherein providing access to the one or more secured resources includes allowing passage through the physical access control device.

5. The system of claim 4, wherein the physical access control device is a door with an electronically controlled lock, a man trap, or a turnstile.

6. The system of claim 1, wherein the system further comprises a security interface computing device, and wherein providing access to the one or more secured resources includes presenting an indication to a security guard via the security interface computing device that the user is permitted access to the one or more secured resources.

7. The system of claim 6, wherein the security interface computing device presents an augmented reality view of at least a portion of the physical location proximate to the access location, and wherein the indication is presented in association with the user in the augmented reality view.

8. The system of claim 7, wherein indications of a lack of permission are presented in association with non-authenticated individuals in the augmented reality view.

9. The system of claim 1, further comprising one or more network access computing devices located within the access location, wherein the security management computing device is further configured to allow access to a network via the one or more network access computing devices while the user is determined to be within the access location.

10. The system of claim 9, wherein the security management computing device is further configured to monitor a location of the mobile device while within the access location, and to disable the one or more network access devices in response to determining that the user or the mobile device has left the access location.

11. The system of claim 9, further comprising;
   a device unique identifier (UID) data store configured to store information organized according to an encrypted hash of a device identifier;
   a profile data store configured to store non-biometric user data organized according to an encrypted hash of a profile identifier stored in the device UID data store; and
   a biometric data store configured to store biometric user data organized according to an encrypted hash of a biometric identifier stored in the profile data store.

12. The system of claim 11, wherein the device UID data store, the profile data store, and the biometric data store are each physically separate from each other.

13. The system of claim 11, wherein allowing access to the network includes:
   using the device UID data store to confirm that the device is allowed access to the system;
   using the profile data store and a profile identifier retrieved from the device UID data store to confirm that the user is allowed access to a requested network resource; and
   using the biometric data store and a biometric row identifier retrieved from the profile data store to confirm the user's identity.

14. The system of claim 1, wherein the one or more secured resources include a secured physical location, a secured network, a secured database, and a secured digital financial transaction.

15. The system of claim 1, wherein the one or more location sensors include one or more devices for monitoring and tracking a Wi-Fi signal, a Bluetooth signal, an Active Radio Frequency Identification (RFID) signal, a UHF-RFID signal, a passive RFID signal, a GPS signal, and a near-field communication signal.

16. The system of claim 1, wherein the one or more cameras are configured to capture images in the visual spectrum and the infrared spectrum.

17. A computer-implemented method of controlling access to a computing resource by a user via a network access device, the method performed by one or more computing devices of an authentication system, the method comprising:
   using a device identifier of a mobile computing device to verify that the mobile computing device is associated with the user and to retrieve a profile identifier from a device data store;
   using the profile identifier to verify that the user is authorized to access the computing resource and to retrieve a biometric row identifier from a profile data store;
   using the biometric row identifier to retrieve biometric data from a biometric data store;
   verifying that biometric data collected from the user matches the biometric data from the biometric data store; and
   providing access to the computing resource in response to the verifying that the biometric data collected from the user matches the biometric data from the biometric data store;
   wherein using the device identifier of the mobile computing device to verify that the mobile computing device is associated with the user includes:
     receiving, by the authentication system from the mobile computing device, a device identifier;
     encrypting, by the authentication system, the device identifier using database credentials for the device identifier data store to create a device database row identifier; and
     retrieving a device database row identified by the device database row identifier from the device data store; and
     determining that the device database row indicates that the mobile computing device is authorized and associated with the user.

18. The method of claim 17, wherein receiving the device identifier includes:

receiving, by the authentication system from the mobile computing device, a device identifier hash value; and extracting the device identifier from the device identifier hash value.

19. The method of claim 17, wherein using the profile identifier to verify that the user is authorized to access the computing resource includes:

encrypting, by the authentication system, the profile identifier using database credentials for the profile data store to create a profile database row identifier;

retrieving a profile database row identified by the profile database row identifier from the profile data store; and determining that the profile database row indicates that the user is authorized to access the computing resource.

20. The method of claim 17, wherein using the biometric row identifier to retrieve biometric data from the biometric data store includes:

decrypting, by the authentication system, the encrypted biometric row identifier using database credentials for the profile data store to obtain a biometric row identifier;

encrypting, by the authentication system, the biometric row identifier using database credentials for the biometric data store to create a newly encrypted biometric row identifier; and using the newly encrypted biometric row identifier to retrieve the biometric data from the biometric data store.

21. The method of claim 17, further comprising:

using the profile identifier to retrieve a second encrypted biometric row identifier from the profile data store; and using the second encrypted biometric row identifier to retrieve biometric data from a second biometric data store that is physically separate from the biometric data store.

22. The method of claim 17, further comprising verifying that a location of the mobile computing device associated with the user is within an authentication boundary.

23. A computer-implemented method of controlling access to a computing resource by a user via a network access device, the method performed by one or more computing devices of an authentication system, the method comprising:

verifying that a location of a mobile computing device associated with the user is within an authentication boundary;

using a device identifier of the mobile computing device to verify that the mobile computing device is associated with the user and to retrieve a profile identifier from a device data store;

using the profile identifier to verify that the user is authorized to access the computing resource and to retrieve a biometric row identifier from a profile data store;

using the biometric row identifier to retrieve biometric data from a biometric data store;

verifying that biometric data collected from the user matches the biometric data from the biometric data store; and providing access to the computing resource in response to the verifying that the biometric data collected from the user matches the biometric data from the biometric data store.

24. The method of claim 23, wherein verifying that the location of the mobile computing device associated with the user is within the authentication boundary includes:

receiving a notification from a location sensor indicating that the mobile computing device is detected within an authentication boundary;

retrieving a facial data record associated with the user from a facial recognition data store;

comparing the facial data record to images of faces captured by a camera; and verifying that the location of the mobile computing device associated with the user is within the authentication boundary upon finding a match between the facial data record and an image of a face captured by the camera.

25. The method of claim 24, wherein the camera is a stationary camera having a field of view that includes at least a portion of an area within the authentication boundary.

26. The method of claim 24, wherein the camera is a camera of the mobile computing device.

* * * * *